US007754298B2

(12) United States Patent
Soria et al.

(10) Patent No.: US 7,754,298 B2
(45) Date of Patent: Jul. 13, 2010

(54) INTERMEDIATE TRANSFER MEMBER AND METHOD FOR MAKING SAME

(75) Inventors: Meir Soria, Jerusalem (IL); Shirley Lee, Poway, CA (US); Yevgenia Rudoy, Rishon Lezion (IL); Frida Avadic, Rishon le Tzion (IL); Nava Klein, Rishon le Tzion (IL); Raia Slivniak-Zozin, Lod (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 844 days.

(21) Appl. No.: 11/609,014

(22) Filed: Dec. 11, 2006

(65) Prior Publication Data

US 2008/0138546 A1 Jun. 12, 2008

(51) Int. Cl.

| | |
|---|---|
| ***B32B 9/04*** | (2006.01) |
| ***B05D 3/02*** | (2006.01) |
| ***G03G 5/00*** | (2006.01) |
| ***G03G 15/14*** | (2006.01) |

(52) U.S. Cl. .................... 428/32.51; 399/302; 399/308; 427/152; 428/447; 430/302; 430/308

(58) Field of Classification Search ....................... None
See application file for complete search history.

(56) References Cited

U.S. PATENT DOCUMENTS

| | | | |
|---|---|---|---|
| 4,749,741 | A | 6/1988 | Saito et al. |
| 5,701,566 | A | 12/1997 | Bisaiji et al. |
| 5,985,371 | A | 11/1999 | Fujioka et al. |
| 6,551,716 | B1 | 4/2003 | Landa et al. |
| 6,773,758 | B2 | 8/2004 | Yamanaka |
| 7,005,475 | B2 | 2/2006 | Griswold |
| 2004/0266923 | A1 | 12/2004 | Fehn et al. |

FOREIGN PATENT DOCUMENTS

| | | | |
|---|---|---|---|
| JP | 09-269673 | A | 10/1997 |
| JP | 11-038795 | A | 2/1999 |
| JP | 2006-58451 | A | 3/2006 |
| JP | 2006-285048 | A | 10/2006 |

OTHER PUBLICATIONS

Hewlett-Packard Company, "White Paper—Digital Offset Color," Copyright Hewlett-Packard Company 2002, 12 pp. [Online] www.idspackaging.com/Common/exhib_362/HPI_White_Paper.pdf.

*Primary Examiner*—Bruce H Hess

(57) ABSTRACT

A method of producing an intermediate transfer member for digital offset printing comprises: a) providing an intermediate transfer member body portion, b) coating the body portion with a rubber layer, c) coating the rubber layer with a primer comprising an organosilane, a photoinitiator, and a catalyst, d) coating the primer with a release layer, and e) applying UV irradiation to the coated primer to bond the release layer to the rubber layer.

21 Claims, 1 Drawing Sheet

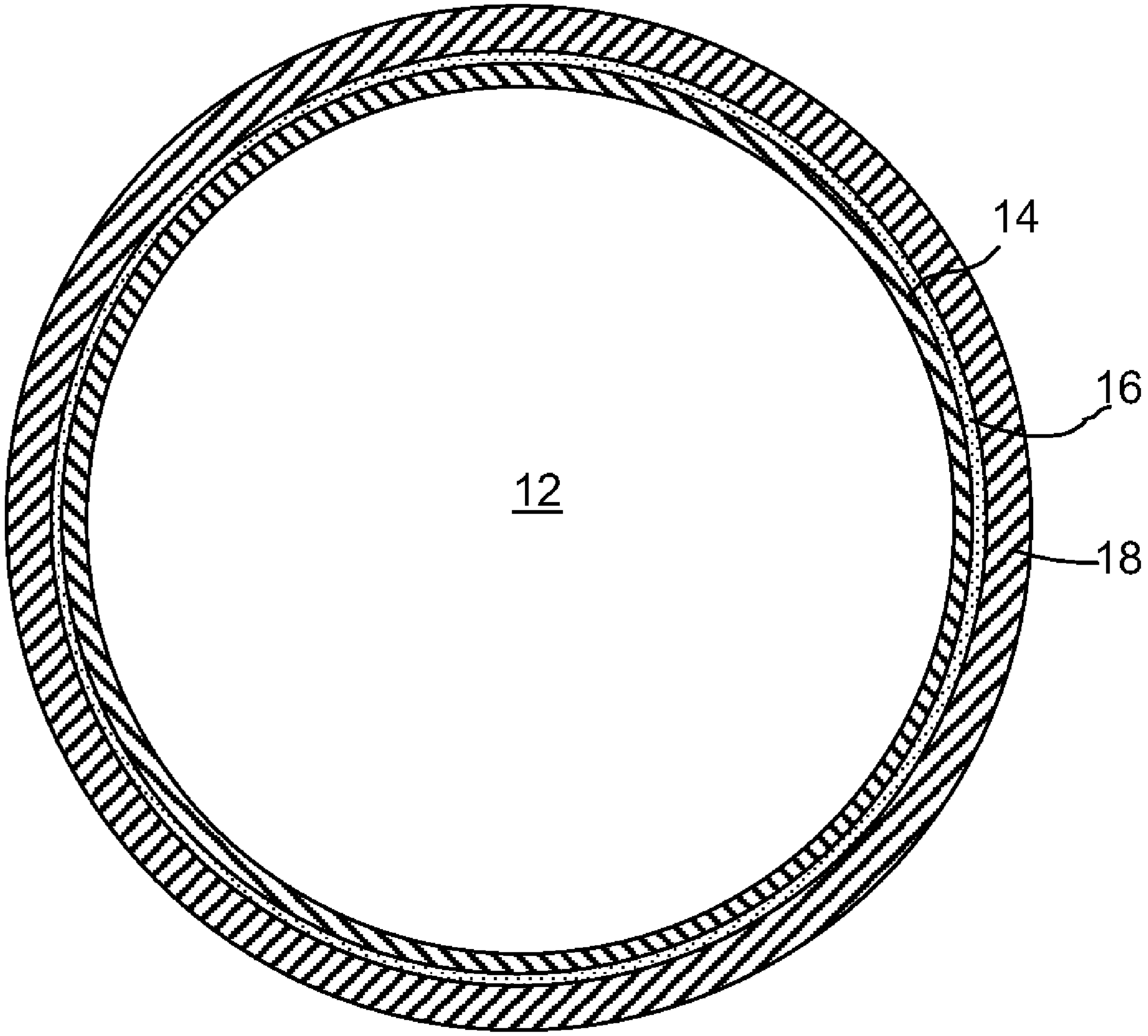
14
16
18
12

INTERMEDIATE TRANSFER MEMBER AND METHOD FOR MAKING SAME

BACKGROUND

The HP Indigo line of digital printing presses is based on digital offset color technology, which combines ink-on-paper quality with multi-color printing on a wide range of paper, foil and plastic substrates. These digital printing presses offer cost-effective short-run printing, on-demand service and on-the-fly color switching.

A digital offset printer works by using digitally controlled lasers to create a latent image in the charged surface of a photo imaging plate (PIP). The lasers are controlled according to digital instructions from a digital image file. Digital instructions typically include one or more of the following parameters: image color, image spacing, image intensity, order of the color layers, etc. Special ink is then applied to the partially-charged surface of the PIP, recreating the desired image. The image is then transferred from the PIP to a heated blanket cylinder, and from the blanket cylinder to the desired substrate, which is placed into contact with the blanket cylinder by means of an impression cylinder. The ink is dry in the printing or imaging machine and becomes fluid on the heated magnetic blanket. Because of its role in transferring an image from the PIP to the ultimate substrate, the blanket may sometimes be referred to as an "intermediate transfer member" (ITM).

A detailed description of the operation of a typical digital offset printer is described in Hewlett-Packard (HP) White Paper Publication, "Digital Offset Color vs. Xerography and Lithography," which is incorporated herein by reference. Specifically, an example of a digital printer that can be used to create the disclosed printed articles is HP's digital printing press Indigo Press™ 1000, 2000, 4000, or newer, presses, manufactured by and commercially available from Hewlett-Packard Company of Palo Alto, Calif., USA.

In order to apply pressure evenly in the course of transferring the ink and to accommodate slight variations in the surface of the substrate, the blanket is typically formed from a resilient material, such as synthetic rubber. Silicone is usually preferred, however, for the outermost layer of the blanket, because of its exceptional ink release properties.

It is difficult to assemble a silicone layer on a rubber underlayer, however, because the desirable release properties of silicone and rubber also make it difficult to form chemical bonds at their respective surfaces. This is particularly true when the rubber layer is fully cured. Heretofore, efforts have been made to use uncured rubber in the manufacture of ITMs, in order to take advantage of the bonding sites in uncured rubber. However, the storage and processing of uncured rubber require expensive low-temperature systems. It is desirable to reduce or eliminate the need for such expensive systems, as well as to provide improved adhesion between the layers.

BRIEF DESCRIPTION OF THE DRAWING

For a detailed description of exemplary embodiments of the invention, reference will now be made to the accompanying drawing, in which the FIGURE shows an intermediate transfer member according to an embodiment of the present invention.

NOTATION AND NOMENCLATURE

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "comprising, but not limited to . . . ."

Similarly, the term "intermediate transfer member" is intended to include and encompass items that may also be referred to as "blankets" or "intermediate transfer media."

As used herein, "rubber" refers to any natural or synthetic elastomer, including but not limited to acrylic rubber and nitrile rubber. Partially uncured rubber may be used, and gives a good result, but the ITM is particularly useful when the rubber is fully or substantially cured. As used herein, "substantially cured" refers to rubber that is more than 50% cured. As used herein, "fully cured" refers to rubber that is more than 90% cured.

DETAILED DESCRIPTION

Referring to the FIGURE an exemplary blanket or ITM 10 includes, a base 12, an rubber layer 14 disposed on base 12, a primer layer 16 disposed on rubber layer 14, and a release layer 18 disposed on primer layer 16. Base 12 supports the other layers and forms a mechanical interface with the printing apparatus, which in turn causes ITM 10 to rotate at an appropriate speed relative to the other components of the laser printer apparatus as to transfer ink images from the PIP to the substrate, as described in more detail below.

In certain embodiments, the rubber layer 14 may be a blend of an acrylic resin Hi-Temp 4051 EP (Zeon) filled with carbon black pearls 130 (Cabot) and a curing system, which may comprise, for example, NPC-50 accelerator (ammonium derivative from Zeon) and sodium stearate crosslinker. The acrylic rubber is at least substantially cured, and, in some embodiments is fully cured. Any suitable rubber can be used for layer 14, including but not limited to nitrile rubber (NBR), hydrogenated nitrile rubber (HNBR), polyurethane elastomer (PU), fluorocarbon elastomer, and fluorosilicone.

Primer layer 16 is applied to the outer surface of rubber layer 14. The primer layer 16 can have thickness of from about 0.01 to 5 micron. In some embodiments, primer layer 16 includes, but is not limited to an organosilane, a photoinitiator and a catalyst.

The organosilane compound can be, for example, a methacryloxypropyl trimethoxysilane, such as Dynasylan® MEMO™ (3-methacryloxypropyltrimethoxysilane) available from Degussa, AG of Piscataway, N.J. Other suitable silanes include but are not limited to epoxyalkyl alkoxysilane (e.g., glycidoxypropyl trimethoxysilane-silane Dynasilan GLYMO (Degussa), acrylate and methacrylate alkoxysilane, alkenylsilane (e.g., vinyl or allyl alkoxysilane), amino functional silane, alkylsilane, non-functional dipodal silane (e.g., bis triethoxysilyl octane), and their condensed forms constituted by oligomers of the monomers form of the silane. The hydrolyzable portion of the silane is preferably an alkoxy group (e.g., alkoxysilane with an alkoxy group selected from the group consisting of methoxy, ethoxy, propoxy, isopropoxy, methoxyethoxy, and the like.) The hydrolyzable groups can also be oxime groups (e.g., methylethylketoxime group) or acetoxy group. Any suitable organosilane may be used to adhere to a polar elastomer surface made from ACM, NBR, fluoroelastomer rubber and the like, so a polar functional silane that contains polar functional groups such as acrylate, methacrylate, epoxysilane, is employed in some embodiments. Although a nonpolar functional silane (e.g., alkylsilane) may be used in some instances, this kind of silane is less compatible with rubber substrates. In some embodiments, the organosilane comprises about 5 to 95 weight % of the total primer layer, and in certain embodiments comprises about 5 to 45 weight % of the total primer layer.

The photoinitiator can be any photoinitiator capable of linking the silane with the rubber surface. In certain embodiments, the photoinitiator comprises Darocur 1173™, available from Ciba Specialty Chemicals of Newport, Del., which comprises 2-hydroxy 2-methyl 1-phenyl 1-propanone, CAS number 7473-98-5. Other suitable photoinitiators include but are not limited to Irgacure 500™ (a 50/50 blend of 1-hydroxy-cyclohexyl phenyl ketone and benzophenone), Irgacure 651™ (an α,α-dimethoxy α-phenyl acetophenone), Irgacure 907™ (2-methyl-1-[4-(methylthio)phenyl]-2-(4-morpholinyl)-1-propanone) from Ciba Specialty Chemicals. Alternatively, any other suitable photoinitiator may be used. In some embodiments, the photoinitiator comprises about 1 to 10 weight % of the total primer layer, and in certain embodiments comprises about 1 to 5 weight % of the total primer layer.

The catalyst component of primer layer 16 comprises a titanate or a tin catalyst, or, alternatively, comprises any suitable compound that is capable of catalyzing a condensation curing reaction of silicone. In certain embodiments, the catalyst is acetylacetonate titanate chelate, available as Tyzor® AA-75 from E.I. du Pont de Nemours and Company of Wilmington, Del. In other embodiments, the catalyst comprises a tin compound such as stannous octoate in xylene as a carrier. In some embodiments, the catalyst comprises about 1 to 20 weight % of the total primer layer, and in certain embodiments comprises about 1 to 5 weight % of the total primer layer.

In addition to these components, primer layer 16 can include other ingredients, including but not limited to: one or more additional organosilanes, which may include an epoxysilane such as glycidoxypropyltrimethoxislane, which is available as GLYMO™ from Degussa AG, solvent to dilute and adjust the solid content during the coating process. Any suitable volatile solvent may be used, such as isopropyl alcohol (IPA), ethyl acetate, low molecular weight aliphatics (e.g., heptane, octate, dodecane), and naphtha, for example.

Primer layer 16 can be applied as a single layer containing all of the active components, or as two or more layers. In certain embodiments where a tin catalyst is used, a first layer containing the organosilane and the photoinitiator is applied, and a separate, second layer containing the catalyst is subsequently applied, so as to avoid negative interaction between the catalyst and the byproducts of photoinitiation.

As mentioned above and illustrated in the FIGURE, a release layer 18 is applied to the outer surface of primer layer 16. Release layer 18 comprises an addition cure RTV silicone material, or, alternatively, comprises any suitable silicone rubber. The condensation cure RTV silicone can be cured at room temperature, however, it is preferred to include a post-cure by holding it at 140° C. for about 2 h. In certain embodiments, release layer 18 has a thickness of about 1 to about 100 μm, and in some embodiments it is about 1 to about 15 μm thick.

An exemplary ITM is constructed by first applying rubber layer 14 to base 12 using techniques known in the art, such as that disclosed in U.S. Pat. No. 6,551,716, which is hereby incorporated herein by reference. In certain embodiments rubber layer 14 is fully cured or substantially cured prior to application of primer layer 16 to the outer surface of rubber layer 14. Each rubber has its own curing conditions which depend on the selected curing system.

If primer layer 16 is to be applied as a single layer, a mixture containing the three components, namely organosilane, photoinitiator, and catalyst, is applied to the outer surface of rubber layer 14 by wire rod or gravure coating. If the primer is to be applied in two or more steps, a first mixture containing at least the photoinitiator and the organosilane, is applied to the outer surface of rubber layer 14 by wire rod or gravure coating. Once the photoinitiator and the organosilane are present on the outside of rubber layer 14, the partially assembled ITM is irradiated with light having a wavelength that corresponds to the optimal wavelength for the photoinitiator. In certain embodiments, the radiation will be UV light. Without being bound by theory, it is believed that irradiation causes the photoinitiator to form bonds with the rubber at the surface of layer 14 and with the silane.

If the catalyst has not yet been applied, a mixture containing the catalyst is then applied as a second layer to the outer surface of the first primer layer. Irradiation of the layer containing the photoinitiator can take place before placement of the catalyst. In the particular case of two layers of primer, the first layer that contains the photoinitiator and the organosilane is applied, followed by UV irradiation. Afterwards, the second layer containing the condensation cure silicone catalyst (e.g., a tin compound) is applied before the coating of the release (silicone layer). Silicone is then applied to the outer surface of the layer containing the catalyst, so as to form release layer 18, using techniques known in the art (e.g., U.S. Pat. No. 6,551,716). The silicone is cured by subjecting it to heat and/or humidity, with the catalyst increasing the rate of cure. In an alternative embodiment, UV radiation is applied at the end of the coating processes, after the condensation cure silicone release layer has been applied to the rubber layer, instead of applying UV radiation to the primer layer 16.

The assembled ITM, comprising base 12, rubber layer 14, and release layer 18, with primer layer 16 forming a structural bond between rubber layer 14 and release layer 18, can be used in a conventional digital offset printing process.

EXAMPLES

By way of illustration, various primer compositions were tested for their efficacy in bonding the release layer to the rubber underlayer. As illustrated below, primer compositions in accordance with the principles described herein were very effective at bonding the release layer to the rubber underlayer.

Primer compositions comprising various amounts of Dynasylan® MEMO™, GLYMO™, Darocur® 1173, and Tyzor® AA75 were applied to a cured acrylic rubber substrate. Each primer was UV cured under 300 W/in Fusion H ultraviolet lamp at a line speed of 5 meters per minute and then a release coating was applied. Table I gives the results of a wet abrasion test in which the blanket is soaked in a high-purity isoparaffinic solvent for 1 min at room temperature and then abraded with a cloth. The results are scaled as follows: 1=bad, release layer easily removed; 2=fair, release layer removed with small effort; 3=good, release layer removed only with great effort; 4=excellent, release layer cannot be removed.

TABLE I

| Primer Composition (parts by weight) | | | | | |
|---|---|---|---|---|---|
| GLYMO ™ (organosilane) | Dynasylan ® MEMO ™ (organosilane) | Darocur ® 1173 (photoinitiator) | Tyzor ® AA75 (catalyst) | Wet abrasion result | Cure time (min @ 90° C.) |
| 42.5 | 42.5 | 5 | 10 | 4 | 6 |
| — | 85 | 5 | 10 | 4 | 7 |
| 47.5 | 47.5 | 5 | — | 3 | 20 |
| 85 | — | 5 | 10 | 4 | 8 |

By comparison, without UV irradiation, primer compositions like the aforementioned compositions gave poor adhesion between the rubber layer and the release layer, with wet abrasion results from 1 to 2.

In another example, a primer composition comprising GLYMO® 42.5/MEMO® 42.5/Darocur® 1173/Tyzor® AA75 10, diluted at 50% with IPA solvent was prepared which had a wet abrasion score of 4, indicating excellent adhesion.

In another example an identical primer composition (50% dilution) was prepared and applied to base 12, and the UV irradiation was applied at the end of the total process, after application of the release layer (18). Excellent adhesion (wet abrasion grade of 4) was again obtained. Without being bound to a single theory, it is believed that, in this example, the photoinitiator might have been more efficient because of less oxygen inhibition from the air.

In another example, a two-layer primer prepared as described above, and yielded results on cured rubber that were comparable to the results obtained when uncured rubber was used in the rubber layer and were much better than when a conventional primer was used on cured rubber. It was further found that the cure time was influenced by the selected silicone resin, however, it is believed that this is largely a function of the inhibitors included in the raw material.

At least some of the embodiments disclosed herein offer an inexpensive and effective technique for assembling a silicone layer on a rubber underlayer in a manner that results in a strong and durable bond therebetween. The foregoing discussion is meant to be illustrative of the principles and various embodiments of the present invention. Numerous variations and modifications will become apparent to those skilled in the art once the above disclosure is fully appreciated. For example, the nature of the base, composition of the rubber layer and release layer, and specific components of the primer layer may each be varied from those identified herein. It is intended that the following claims be interpreted to embrace all such variations and modifications. Likewise, unless expressly so stated, it is intended that the sequential recitation of steps in a claim is not a requirement that the steps be performed sequentially, or that a given step be completed before another step is commenced.

What is claimed is:

1. A method of producing an intermediate transfer member for digital offset printing, the method comprising:

a) providing an intermediate transfer member body portion;

b) coating the body portion with a rubber layer;

c) coating the rubber layer with a primer comprising an organosilane, a photoinitiator, and a catalyst;

d) coating the primer with a release coating material comprising an uncured silicone polymer for which the catalyst is active for curing;

e) applying UV irradiation to the primer coating to link the organosilane to the rubber layer; and f) curing said silicone polymer, to form a release layer, to provide said intermediate transfer member wherein said release layer is structurally bonded to said rubber layer.

2. The method according to claim 1 wherein the silicone polymer is a condensation type silicone.

3. The method according to claim 1 wherein, in b), the rubber layer comprises uncured rubber, substantially cured rubber or fully cured rubber.

4. The method according to claim 1 wherein the rubber is selected from the group consisting of acrylic rubbers, butadiene acrylonitrile rubbers, hydrogenated nitrile rubber, polyurethane rubbers, fluorocarbon rubbers and fluorosilicone elastomers.

5. The method according to claim 1 wherein step c) is carried out in three steps comprising:

i) applying the organosilane and the photoinitiator to said rubber layer;

ii) applying said UV light irradiation to link said organosilane and said rubber layer; and iii) applying the catalyst to the resulting organosilane-linked rubber layer.

6. The method according to claim 1 wherein the catalyst is selected from the group consisting of tin compounds, organic titanates and organic zirconates.

7. The method according to claim 1 wherein the photoinitiator is selected from the group consisting of α-hydroxyketones, α-aminoketones and benzaldimethyl-ketal.

8. An intermediate transfer member suitable for receiving an ink image from a first surface and transferring it to a second surface, comprising:

a body;

a rubber layer disposed on said body;

a primer disposed on said rubber layer and comprising an organosilane, a photoinitiator, and a catalyst; and a release layer disposed on said primer, wherein said release layer comprises a silicone polymer capable of being cured by said catalyst.

9. The intermediate transfer member according to claim 8, wherein, after irradiating the primer disposed on said rubber layer, the organosilane is linked to the rubber layer.

10. The intermediate transfer member according to claim 8 wherein the silicone polymer is a condensation type silicone.

11. The intermediate transfer member according to claim 8 wherein the rubber layer comprises uncured rubber, substantially cured rubber or fully cured rubber.

12. The intermediate transfer member according to claim 8 wherein the rubber is selected from the group consisting of acrylic rubbers, butadiene acrylonitrile rubbers, polyurethane rubbers, and cured fluorosilicone elastomers.

13. The intermediate transfer member according to claim 8 wherein the catalyst is selected from the group consisting of tin compounds and titanates.

14. A method of adhering a silicone release coating to a rubber member comprising:

coating the rubber member with a primer comprising an organosilane, a photoinitiator, and a catalyst;

overcoating the primer with a release coating material comprising an uncured silicone polymer for which the catalyst is active for curing the polymer; and curing the silicone polymer, to form a release layer structurally bonded to said rubber member.

15. The method according to claim 14, further including the step of irradiating the primer-coated rubber member so as to cause the organosilane to link to the rubber layer before carrying out said step of overcoating said primer with said release coating material.

16. The method according to claim 14 wherein the rubber layer comprises substantially cured rubber.

17. The method according to claim 14 wherein the rubber layer comprises fully cured rubber.

18. The method according to claim 14 wherein the rubber is selected from the group consisting of acrylic rubbers, butadiene acrylonitrile rubbers, polyurethane rubbers, and cured fluorosilicone elastomers.

19. The method according to claim 14 wherein the catalyst is selected from the group consisting of tin compounds and titanates.

20. The method according to claim 14 wherein said coating step comprises coating the rubber member with a primer comprising an organosilane, at least one additional organosilane, a photoinitiator, and a catalyst.

21. The method according to claim 14 further comprising, after carrying out said step of overcoating said primer with said release coating material, irradiating the primer-coated rubber member so as to cause the organosilane to link to the rubber layer.

* * * * *